(12) United States Patent
Mulloy

(10) Patent No.: US 8,082,736 B2
(45) Date of Patent: Dec. 27, 2011

(54) TEMPERATURE DETERMINATION TECHNIQUE FOR A TURBOCHARGER

(75) Inventor: John M. Mulloy, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 11/325,170

(22) Filed: Jan. 4, 2006

(65) Prior Publication Data
US 2007/0151240 A1 Jul. 5, 2007

(51) Int. Cl.
- F02D 23/00 (2006.01)
- F02B 33/44 (2006.01)
- F02M 25/07 (2006.01)
- F01N 5/04 (2006.01)
- F01N 3/00 (2006.01)

(52) U.S. Cl. ............... 60/602; 60/605.2; 60/280; 60/285
(58) Field of Classification Search ............ 60/280, 60/285, 290, 600–602, 606, 611, 605.2
See application file for complete search history.

(56) References Cited

U.S. PATENT DOCUMENTS

| | | | |
|---|---|---|---|
| 4,077,219 A | 3/1978 | Melchior et al. | |
| 4,467,608 A * | 8/1984 | Matushiro et al. | 60/602 |
| 4,604,701 A | 8/1986 | Fujawa et al. | |
| 4,785,635 A * | 11/1988 | Melchior et al. | 60/606 |
| 5,850,737 A * | 12/1998 | Aschner et al. | 60/602 |
| 6,067,800 A * | 5/2000 | Kolmanovsky et al. | 60/602 |
| 6,155,049 A * | 12/2000 | Bischoff | 60/602 |
| 6,256,992 B1 | 7/2001 | Lewis, Jr. et al. | |
| 6,276,139 B1 * | 8/2001 | Moraal et al. | 60/606 |
| 6,301,887 B1 | 10/2001 | Gorel et al. | |
| 6,360,541 B2 | 3/2002 | Waszkiewicz et al. | |
| 6,401,457 B1 * | 6/2002 | Wang et al. | 60/599 |
| 6,508,242 B2 | 1/2003 | Jaliwala et al. | |
| 6,557,347 B1 * | 5/2003 | Alvarez et al. | 60/611 |
| 6,557,539 B2 * | 5/2003 | Sterner | 123/676 |
| 6,568,173 B1 * | 5/2003 | Kolmanovsky et al. | 60/280 |
| 6,609,372 B2 * | 8/2003 | Maddock et al. | 60/602 |
| 6,619,261 B1 | 9/2003 | Wang et al. | |
| 6,651,432 B1 * | 11/2003 | Gray, Jr. | 60/605.2 |
| 6,687,601 B2 * | 2/2004 | Bale et al. | 701/108 |
| 6,715,287 B1 * | 4/2004 | Engel et al. | 60/602 |
| 6,718,251 B2 | 4/2004 | Brackney et al. | |
| 6,732,522 B2 | 5/2004 | Wright et al. | |
| 6,804,601 B2 | 10/2004 | Wang et al. | |
| 6,848,434 B2 | 2/2005 | Li et al. | |
| 6,850,833 B1 | 2/2005 | Wang et al. | |
| 6,851,256 B2 * | 2/2005 | Chamoto et al. | 60/280 |
| 6,910,329 B2 * | 6/2005 | Bunting et al. | 60/297 |
| 7,089,736 B2 * | 8/2006 | McDonald | 60/602 |
| 7,150,151 B2 * | 12/2006 | Mulloy et al. | 60/602 |
| 7,174,713 B2 * | 2/2007 | Nitzke et al. | 60/605.2 |
| 7,237,381 B2 * | 7/2007 | Kolavennu et al. | 60/608 |

(Continued)

*Primary Examiner* — Thai Ba Trieu
(74) *Attorney, Agent, or Firm* — Matthew D. Fair; L. Scott Paynter; Krieg DeVault LLP

(57) ABSTRACT

One embodiment of the present invention is an internal combustion engine system that includes an internal combustion engine, a turbocharger with a compressor and a turbine and a gas flow pathway defined therebetween, one or more pressure sensors to detect pressure along the gas flow pathway, an emission control device structured to receive exhaust from the turbocharger, and a controller responsive to input from the one or more pressure sensors. The controller determines a control signal indicative of turbine outlet temperature as a function of such input, and selectively generates an output signal to adjust temperature of the exhaust provided to the emission control device from the turbocharger in response to the control signal.

20 Claims, 5 Drawing Sheets

U.S. PATENT DOCUMENTS

| | | |
|---|---|---|
| 7,434,398 B2 * | 10/2008 | Olsson et al. .................. 60/602 |
| 2005/0021218 A1 | 1/2005 | Bhargava et al. |
| 2005/0060999 A1 | 3/2005 | Mulloy et al. |
| 2005/0172627 A1 | 8/2005 | Baize et al. |
| 2005/0193810 A1 | 9/2005 | Gladden |
| 2005/0241302 A1 | 11/2005 | Weber et al. |
| 2008/0040085 A1 * | 2/2008 | Wang ............................... 703/7 |

* cited by examiner

TEMPERATURE DETERMINATION TECHNIQUE FOR A TURBOCHARGER

BACKGROUND

The present invention relates to operation of an engine including a turbocharger, and more particularly, but not exclusively relates to determining a signal representative of turbine outlet temperature for an engine turbocharger. In one application, this signal may be used to thermally manage operation of an emission control device. Alternatively or additionally, such a signal may be used differently in other applications.

Control systems for internal combustion engines typically include the input of various engine operating parameters. Some desired input parameters cannot be cost-effectively detected using available sensor technology. For example, direct sensing of extreme temperatures can be undesirable. Nonetheless, temperature inputs are of growing importance in regulating various operations of internal combustion engine systems—especially those directed to emissions control. Thus, there is a continuing demand for further contributions in this area of technology.

SUMMARY

One embodiment of the present invention includes a unique technique to determine a control value indicative of temperature at the outlet of a turbine included in a turbocharger. Other embodiments include unique apparatus, devices, systems, and methods to regulate operation of an internal combustion engine. Further embodiments, forms, objects, features, advantages, aspects, and benefits of the present application shall become apparent from the detailed description and drawings included herein.

DETAILED DESCRIPTION OF SELECTED EMBODIMENTS

Figure 1:
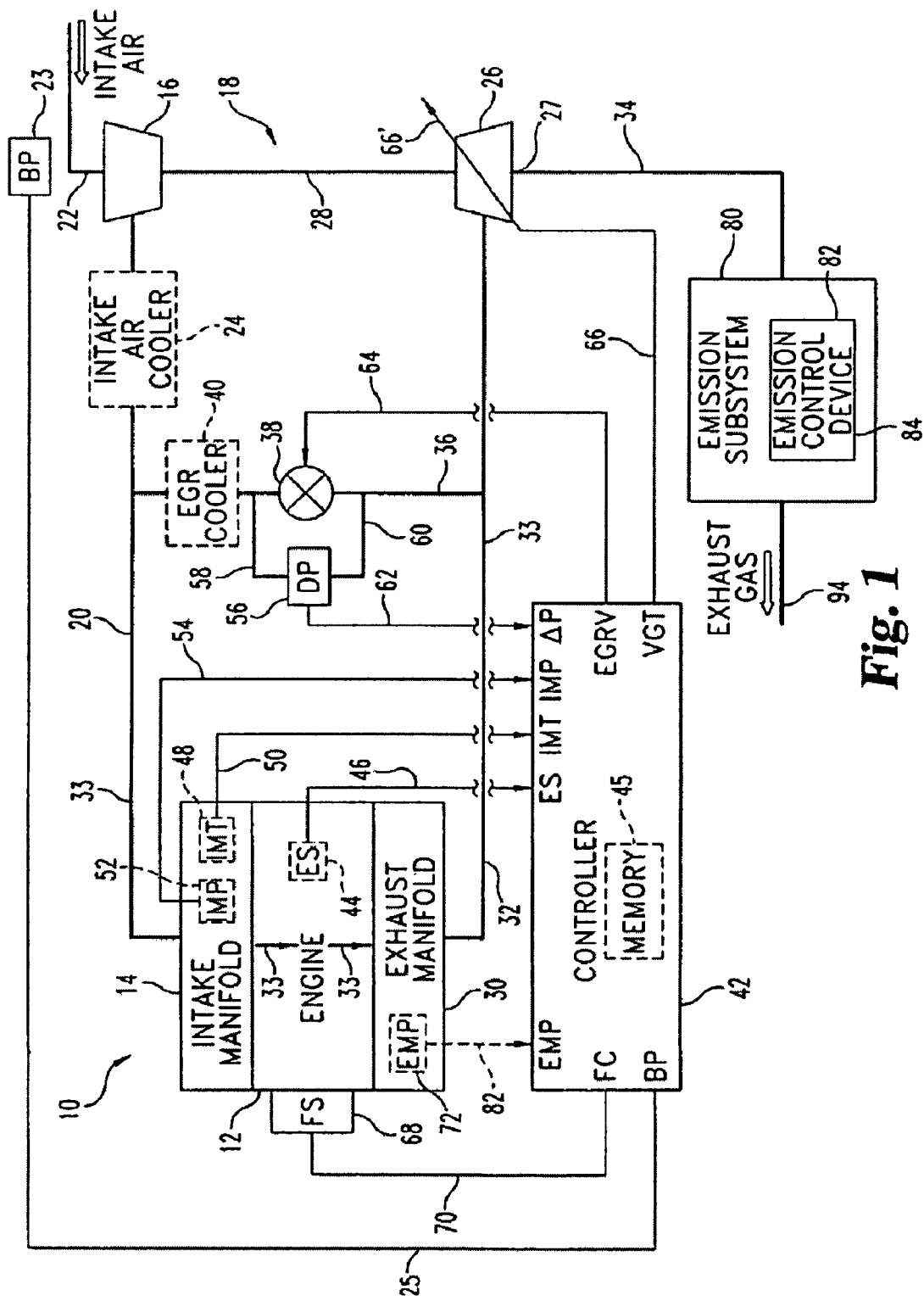
FIG. 1 is a diagrammatic view of an internal combustion engine system including a turbocharger.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

One embodiment of the present invention includes the determination of a temperature associated with a turbocharger as a function of a sensed parameter other than the temperature of interest. In one form, such parameter is a gas pressure associated with operation of an engine that provides exhaust gas to drive the turbine. In one more particular form, the temperature is determined from a difference in gas pressures measured along a gas flow path upstream of the turbocharger.

FIG. 1 shows an engine system 10 of another embodiment of the present invention. System 10 includes an internal combustion engine 12 having an intake manifold 14 fluidly coupled to an outlet of a compressor 16 of a turbocharger 18 via an intake conduit 20. Compressor 16 includes a compressor inlet coupled to an intake conduit 22 for receiving fresh air therefrom. Optionally, as shown in phantom in FIG. 1, system 10 may include an intake air cooler 24 of known construction disposed in line with intake conduit 20 between compressor 16 and intake manifold 14. The turbocharger compressor 16 is mechanically coupled to a turbocharger turbine 26 via a drive shaft 28. Turbine 26 includes a turbine inlet fluidly coupled to an exhaust manifold 30 of engine 12 via an exhaust conduit 32. Collectively, conduit 20, intake manifold 14, engine 12, exhaust manifold 30, and conduit 32 define a pathway 33 along which gas flows from compressor 16 to turbine 26 during nominal operation of engine 12. Engine 12 can be of any type. In one form, engine 12 is of a reciprocating piston type with four stroke operation. Alternatively, or additionally, engine 12 is of a diesel-fueled, compression ignition type with direct or port fuel injection. In other embodiments, engine 12 may be fueled differently, may be of the rotary combustion type, or otherwise differ as would occur to those skilled in the art.

An EGR valve 38 is disposed in-line with an EGR conduit 36 fluidly coupled at one end to intake conduit 20 and at an opposite end to exhaust conduit 32. An EGR cooler 40 of known construction may optionally be disposed in-line with EGR conduit 36 between EGR valve 38 and intake conduit 20 as shown in phantom in FIG. 1.

System 10 includes a controller 42 that is generally operable to control and manage operational aspects of engine 12. Controller 42 includes memory 45 as well as a number of inputs and outputs for interfacing with various sensors and systems coupled to engine 12. Controller 42 can be an electronic circuit comprised of one or more components, including digital circuitry, analog circuitry, or both. Controller 42 may be a software and/or firmware programmable type; a hardwired, dedicated state machine; or a combination of these. In one embodiment, Controller 42 is of a programmable microcontroller solid-state integrated circuit type that includes memory 45 and one or more central processing units. Memory 45 can be comprised of one or more components and can be of any volatile or nonvolatile type, including the solid-state variety, the optical media variety, the magnetic variety, a combination of these, or such different arrangement as would occur to those skilled in the art. Controller 42 can include signal conditioners, signal format converters (such as analog-to-digital and digital-to-analog converters), limiters, clamps, filters, and the like as needed to perform various control and regulation operations described herein. Controller 42, in one embodiment, may be a standard type sometimes referred to as an electronic or engine control module (ECM), electronic or engine control unit (ECU) or the like, that is directed to the regulation and control of overall engine operation. Alternatively, controller 42 may be dedicated to control of just the operations described herein or to a subset of controlled aspects of engine 12. In any case, controller 42 preferably includes one or more control algorithms defined by operating logic in the form of software instructions, hardware instructions, dedicated hardware, or the like. These algorithms will be described in greater detail hereinafter, for controlling operation of various aspects of system 10.

Controller 42 includes a number of inputs for receiving signals from various sensors or sensing systems associated with system 10. For example, system 10 includes an engine speed sensor 44 electrically connected to an engine speed input, ES, of controller 42 via signal path 46. Engine speed sensor 44 is operable to sense rotational speed of the engine 12 and produce an engine speed signal on signal path 46 indicative of engine rotational speed. In one embodiment, sensor 44 is a Hall effect sensor operable to determine engine speed by sensing passage thereby of a number of equi-angularly spaced teeth formed on a gear or tone wheel. Alternatively, engine speed sensor 44 may be any other known sensor operable as just described including, but not limited to, a variable reluctance sensor or the like.

System 10 includes a barometric pressure sensor 23 in fluid contact with ambient air to determine barometric pressure. Sensor 23 is electrically coupled to barometric pressure input BP of controller 42 by signal path 25. System 10 further includes an intake manifold temperature sensor 48 disposed in fluid communication with the intake manifold 14 of engine 12, and electrically connected to an intake manifold temperature input (IMT) of controller 42 via signal path 50. Intake manifold temperature sensor 48 may be of known construction, and is operable to produce a temperature signal on signal path 50 indicative of the temperature of air charge flowing into the intake manifold 14, wherein the air charge flowing into the intake manifold 14 is generally made up of fresh air supplied by the turbocharger compressor 16 combined with recirculated exhaust gas supplied by EGR valve 38.

System 10 further includes an intake manifold pressure sensor 52 disposed in fluid communication with intake manifold 14 and electrically connected to an intake manifold pressure input (IMP) of controller 42 via signal path 54. Alternatively, pressure sensor 52 may be disposed in fluid communication with intake conduit 20. In any case, pressure sensor 52 may be of known construction, and is operable to produce a pressure signal on signal path 54 indicative of air pressure within intake conduit 20 and intake manifold 14.

System 10 also includes an exhaust manifold pressure sensor 72 disposed in fluid communication with exhaust manifold 30 and electrically connected to an exhaust manifold pressure input (EMP) of controller 42 via signal path 82. Alternatively, pressure sensor 72 may be disposed in the fluid communication with exhaust conduit 32. In any case, pressure sensor 72 may be of known construction and is operable to produce pressure signal on signal path 82 indicative of gas pressure within exhaust conduit 32 and exhaust manifold 30.

System 10 further includes a differential pressure sensor, or DP sensor, 56 fluidly coupled at one end to EGR conduit 36 adjacent to an exhaust gas inlet of EGR valve 38 via conduit 60, and fluidly coupled at its opposite end to EGR conduit 36 adjacent to an exhaust gas outlet of EGR valve 38 via conduit 58. Alternatively, DP sensor 56 may be coupled across another flow restriction mechanism disposed in-line with EGR conduit 36. In either case, the DP sensor 56 may be of known construction and is electrically connected to a DP input of controller 42 via signal path 62. DP sensor 62 is operable to provide a differential pressure signal on signal path 62 indicative of the pressure differential across EGR valve 38 or other flow restriction mechanism disposed in-line with EGR conduit 36. Nonetheless, it should be recognized that in other embodiments EGR valve 38, DP sensor 56, and associated conduits, coolers, and the like, may be absent. Controller 42 also includes a number of outputs for controlling one or more engine functions associated with system 10.

For example, EGR valve 38 is electrically connected to an EGR valve output (EGRV) of controller 42 via signal path 64. Controller 42 is operable, as is known in the art, to produce an EGR valve control signal on signal path 64 to correspondingly control the position of EGR valve 38 relative to a reference position in a known manner. Controller 42 is accordingly operable to control EGR valve 38 to selectively provide a flow of recirculated exhaust gas from exhaust manifold 30 to intake manifold 14. Accordingly, while composition of gas flowing along pathway 33 changes from: (a) compressed air, (b) to an air/fuel charge, and then (c) to exhaust—when EGR valve 38 is closed—such composition may also include various amounts of recirculated exhaust gas when EGR valve 38 is open.

Controller 42 also includes at least one output, VGT, for controlling turbocharger swallowing capacity and/or efficiency, wherein the term "turbocharger swallowing capacity" is defined for purposes of the present invention as the exhaust gas flow capacity of the turbocharger turbine 26, and the term "turbocharger swallowing efficiency" refers to response of the turbocharger turbine 26 to the flow of engine exhaust gas. System 10 may include any one or more of a number of air handling mechanisms for controlling exhaust gas flow through turbocharger 28, such as a variable geometry turbocharger turbine (VGT) mechanism 66', which is schematically illustrated in FIG. 1. VGT mechanism 66' is electrically connected to the VGT output of controller 42 via signal path 66. One example of this mechanism is an electronically controllable variable geometry turbocharger turbine 26 that includes a variable geometry actuator (not shown) electrically connected to signal path 66. In this embodiment, controller 42 is operable to produce a variable geometry turbocharger control signal on signal path 66 to control the swallowing capacity (i.e., exhaust gas flow capacity) of turbine 26 by controlling the flow geometry of turbine 26 in a standard manner. Further examples of VGT arrangements are described in commonly owned U.S. Pat. application Ser. No. 10/840,057 to Mulloy et al. (U.S. Patent Application Pub. No. US 2005/0060999 A1), which is hereby incorporated by reference in its entirety.

Another control mechanism that optionally may be included within system 10 is an electronically controllable wastegate valve (not shown) having a wastegate valve actuator (not shown) electrically connected to controller 42. The wastegate valve has an inlet fluidly coupled to exhaust conduit 32, and an outlet fluidly coupled to exhaust conduit 34. Controller 42 is operable to produce a wastegate valve control signal to control the position of the wastegate valve relative to a reference position. The position of the wastegate valve defines a cross-sectional flow area therethrough, and by controlling the cross-sectional flow area of the wastegate valve, controller 42 is operable to selectively divert exhaust gas away from turbine 26, and thereby control the swallowing efficiency of turbine 26.

System 10 further includes a fuel system 68 electrically connected to a fuel command output (FC) of controller 42 via signal path 70. Fuel system 68 is responsive to fueling commands produced by controller 42 on signal path 70 to supply fuel to engine 12. In accordance with one aspect of the present invention, controller 42 is operable to produce such fueling commands in a manner that maintains an engine operating condition within one or more specified limits.

System 10 also includes emissions subsystem 80 to provide for after-treatment of exhaust gases before discharge through a conduit 94. During engine operation, exhaust gas flows from turbine outlet 27 to a conduit 34 in fluid communication therewith. Conduit 34 is also in fluid communication with subsystem 80 which receives the exhaust gas from turbine 26 for after-treatment. Subsystem 80 can include a number of devices to chemically convert and/or remove undesirable constituents from the exhaust stream before discharge into the environment. Specifically, subsystem 80 includes emission control device 82 in the form of a particle trap 84. Trap 84 is arranged to capture particulate matter contained in the exhaust stream, including soot and the like. From time-to-time, trap 84 needs to be regenerated by "burning off" trapped particles, which is performed by elevating the exhaust gas temperature, as will be more fully described hereinafter in connection with FIG. 5.

Among the aspects of engine operation regulated by controller 42 are determining an appropriate amount of fueling as a function of the engine speed signal (ES) from engine speed sensor 44 via signal path 46, as well as a number of additional input signals; and generating a corresponding fueling command (FC) output as a function of a mass fuel flow rate (fuel flow) value and fueling timing in accordance with techniques known to those skilled in the art. In accordance with other aspects of the present invention, controller 42 executes logic to control temperature associated with turbine 26. Furthermore, in some applications it is desirable to control one or more aspects of the operation of system 10 based on a temperature of turbine 26. Unfortunately, it is also frequently undesirable to utilize a sensor to measure temperatures associated with turbine 26 due to cost, reliability, etc.

Figure 2:
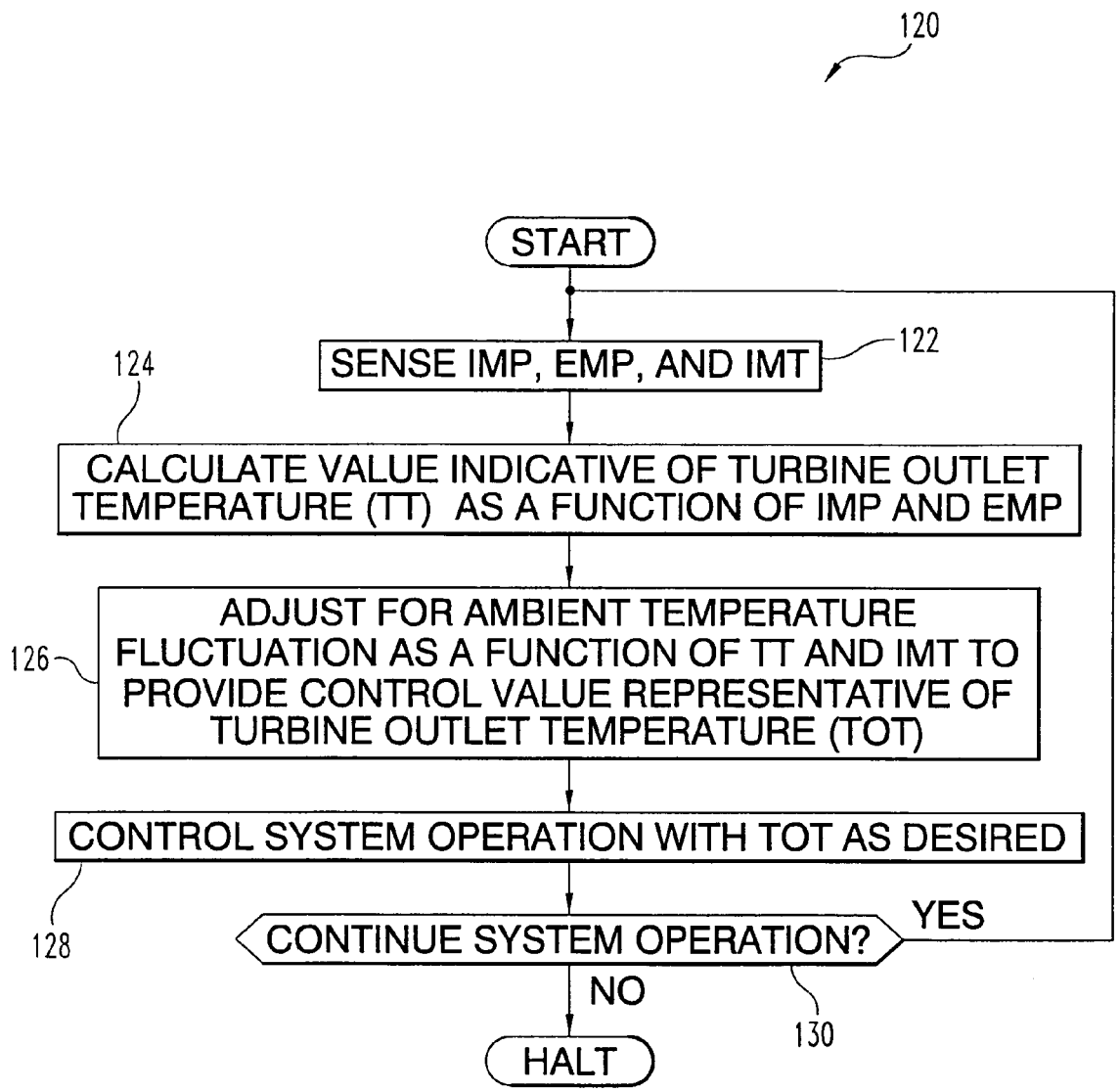
FIG. 2 is a flowchart corresponding to determination of a control value indicative of a temperature associated with the exhaust output of the turbocharger of FIG. 1.

FIG. 2 illustrates procedure 120 in flowchart form. Procedure 120 is directed to determining a signal representative of turbine outlet temperature, designated TOT. Procedure 120 begins with sensing various engine parameters in operation 122—specifically intake manifold pressure IMP, exhaust manifold pressure EMP, and intake manifold temperature IMT. Procedure 120 continues with operation 124. In operation 124, a value indicative of turbine outlet temperature uncorrected for ambient temperature fluctuation (TT) is calculated as a function of IMP and EMP in accordance with the following expression (1):

$$TT=(EMP-IMP)/IMP(abs); \quad (1)$$

where the parenthetical "(abs)" in the denominator indicates that the denominator variable "IMP (abs)" is an absolute pressure. IMP sensor 52 and EMP sensor 72 can be of an absolute pressure type, in which case the difference (EMP−IMP) in the numerator of expression (1) cancels out the barometric pressure constant present in both the EMP and IMP terms, and leaves the denominator in absolute pressure terms as indicated by (abs). Alternatively, if sensors 52 and 72 are not of an absolute type, the "IMP (abs)" denominator can be obtained by adding the IMP pressure from sensor 52 and barometric pressure from sensor 23 together. While the depicted embodiment includes barometric pressure sensor 23, it should be appreciated that sensor 23 may be absent when sensors 52 and 72 are of an absolute pressure type and sensor 23 is not otherwise needed for system 10.

Figure 3:
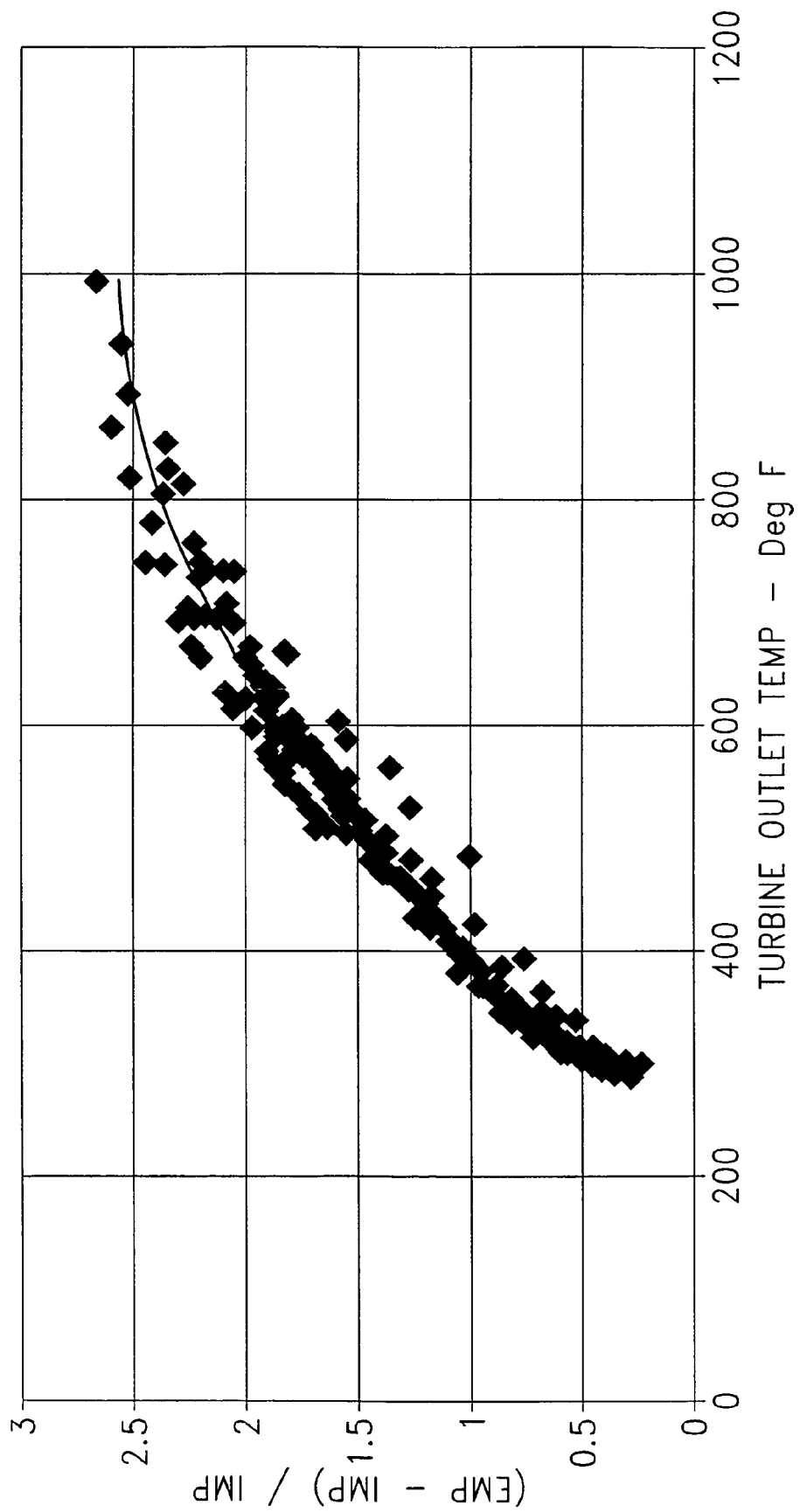
FIGS. 3 and 4 are graphs of experimental results relating to the control value determination of FIG. 2.
Figure 4:
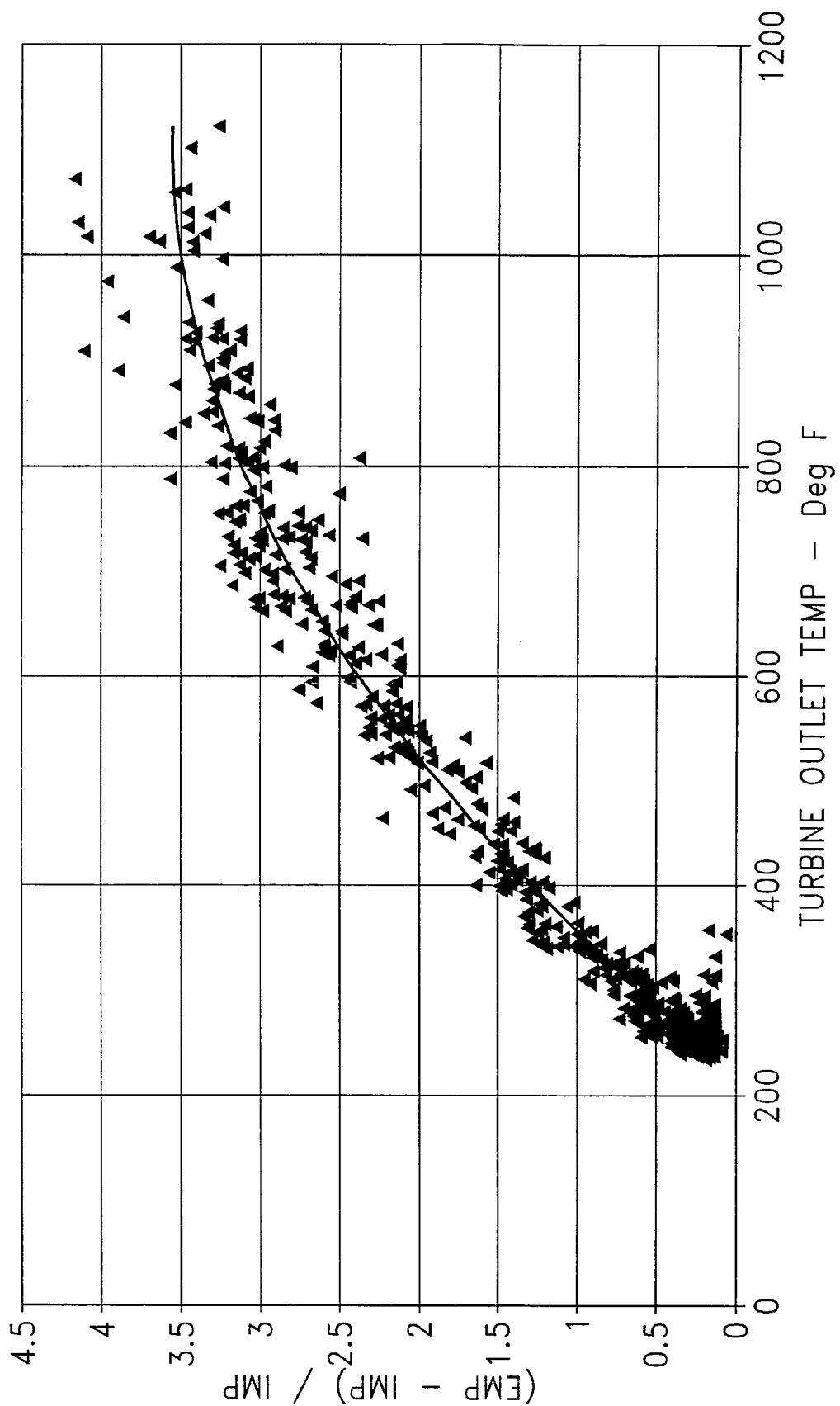

It was surprisingly discovered that temperature at the turbine outlet depends on a pressure differential along the pathway of gas flow upstream of the turbine. This relationship has been experimentally confirmed. Referring additionally to FIG. 3 and FIG. 4, an empirically determined data plot is shown for each of two different engine configurations. Specifically, (EMP−IMP)/IMP versus turbine outlet temperature in degrees Fahrenheit is illustrated. Furthermore, a polynomial approximation with relatively high statistical significance has been determined for each of these data plots. For FIG. 3, the polynomial approximation corresponds to, $y=-4 \times 10^{-6}x^2+0.0084x-1.7003$ and for FIG. 4 the polynomial approximation corresponds to $y=-5 \times 10^{-6}x^2+0.01x-2.0049$. The data collected in FIGS. 3 and 4 correspond to different engine configurations, each with a wide variety of operational conditions and settings. Accordingly, in operation 124, expression (1) is utilized to determine a value indicative of turbine outlet temperature applicable to different operating conditions.

Under certain circumstances, it has been found that this value may fluctuate with different ambient air temperatures to such an extent that there is a desire to correct the result for this variation in certain applications. Accordingly, in operation 126, procedure 120 adjusts for ambient temperature variation as a function of the temperature value TT and the intake manifold temperature (IMT) to provide a signal representative turbine outlet temperature, which is designated TOT. This function is performed in accordance with the following expression (2):

$$TOT=(TT-IMT)/IMT(abs); \quad (2)$$

Where the parenthetical "(abs)" in the denominator indicates that the denominator variable "IMT(abs)" is absolute temperature, which is obtained by adding a constant to the temperature from sensor 48. As in the case of expression (1), the numerator does not require this addition because of the canceling affect of the subtraction operation. Notably, the value TT can be used to look-up an appropriate TOT based on IMT in accordance with expression (2). Likewise, while shown as a mathematical relationship, schedules or look-up tables may be alternatively or additionally utilized in addition to mathematically calculating a value. Moreover, it should be recognized that such values are a form of signal that may be generated with controller 42.

From operation 126, procedure 120 continues with operation 128 in which the control system is operated with the TOT signal as desired. From operation 128, procedure 120 continues with conditional 130. Conditional 130 tests whether to continue system operation. If the test of conditional 130 is true (YES), then control returns to operation 122 to repeat operations 122-128. If the test of conditional 130 is negative (NO), then procedure 120 halts. It should be recognized that while shown in an ordered flowchart sequence, selected operations may be performed in parallel instead of in sequence. Alternatively or additionally, procedure 120 can be executed on a periodic basis, an aperiodic basis, in response to an interrupt, or as would otherwise occur to those skilled in the art.

Figure 5:
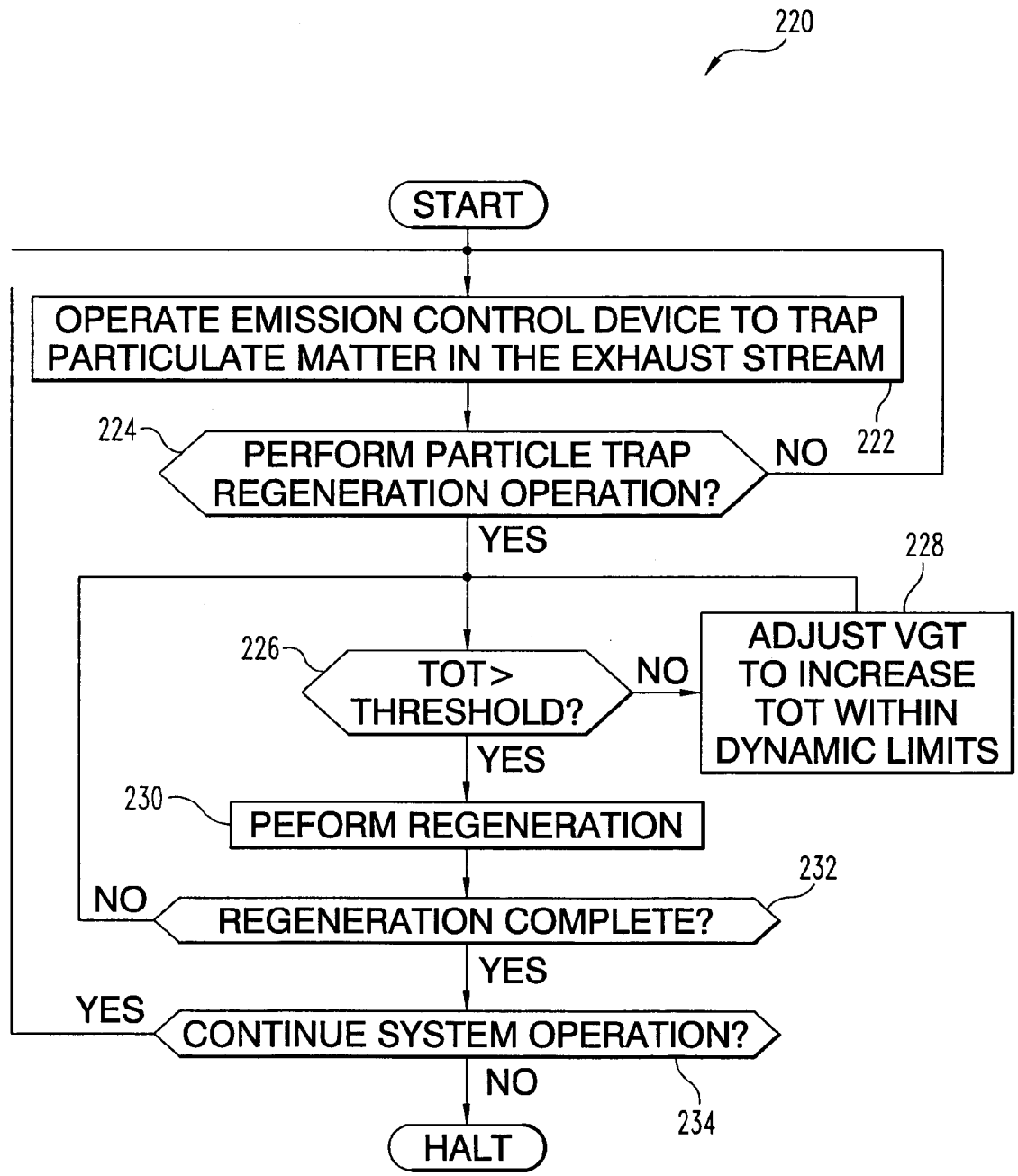
FIG. 5 is a flowchart corresponding to one application of the control value determined in accordance with the flowchart of FIG. 2.

Referring next to FIG. 5, procedure 220 is shown in flowchart form. Procedure 220 is directed to a particular application of the temperature representation provided by the TOT signal for use in regulating operation of emission subsystem 80. Specifically, procedure 220 begins with operation 222 in which the emission control device 82 is operated in a normal manner to trap particulate matter in the exhaust stream from turbine 26. From time-to-time, proper operation of particle trap 84 requires regeneration. Such regeneration includes providing an exhaust temperature to subsystem 80 in excess of a predefined threshold during a designated regeneration mode of operation. In one nonlimiting form, this threshold temperature corresponds to about 600 degrees Fahrenheit at the turbine outlet. Accordingly, conditional 224 of procedure 220 tests whether to perform a particle trap regeneration operation. If the test of conditional 224 is negative (NO), control returns to operation 222. On the other hand, if the test of conditional 224 is positive (YES), procedure 220 continues with conditional 226.

Conditional 226 tests whether the TOT signal is above the predefined temperature threshold needed to perform particle trap regeneration. If the test of conditional 226 is negative (NO), then operation 228 is performed. Operation 228 includes adjusting the VGT mechanism 66' to increase the turbine outlet temperature within acceptable limits. These limits may include maximums imposed to avoid an excessively high smoke content and/or an excessively low air-to-fuel (A/F) ratio relative to performance criteria of system 10. More specifically, the adjustment of VGT mechanism 66' can include adjusting the turbine so that a smaller throat is presented to exhaust gas flowing therethrough. It has been found that such an adjustment increases temperature of the exhaust gas exiting the outlet of turbine 26, and such temperature can be sustained for regeneration purposes. After performance of operation 228, conditional 226 is again performed to test whether the turbine outlet temperature as indicated by the TOT signal exceeds the required temperature threshold. In some cases, performance of the loop between conditional 226 and operation 228 may be performed several times until the engine speed and/or load meet certain criteria necessary to produce the required conditions for a turbine outlet temperature above the required threshold. Such limits may be determined by mapping the response to an operational range of VGT mechanism positions. Furthermore, in one form EGR is maintained in a nonoperational mode during procedure 220 such that intake manifold pressure IMP may be used to indicate A/F.

Once the test of conditional 226 is true (YES), procedure 220 continues with operation 230 in which regeneration takes place. During this operating mode, the elevated temperature typically burns-off particles trapped with emission control device 82. From operation 230, conditional 232 tests whether regeneration is complete. If the test of conditional 232 is negative (NO), such that regeneration has not been completed as determined with a timer or other means, then conditional 232 loops back to conditional 226 to repeat conditional 226 and operations 228-230 until the test of conditional 232 is affirmative (YES). Once the test of conditional 232 is affirmative, conditional 234 is encountered. Conditional 234 tests whether to continue system operation or not. If the test of conditional 234 is affirmative (YES), procedure 220 returns to operation 222 to continue a nominal operating mode of emission control device 82. If the test of conditional 234 is negative (NO), then procedure 220 halts.

Many other embodiments of the present invention are envisioned. For example, in other embodiments, the temperature representative signal may be determined using more or fewer of the indicated parameters with or without other substitute parameters. In a further example, adjustment for ambient temperature fluctuation may not be needed—such as operating environments where ambient temperature is generally constant or causes acceptable variation.

In another example, an internal combustion engine system includes a turbocharger with a compressor and a turbine. The system defines a pathway for gas flow from the compressor to the turbine through the engine. The system further includes: means for determining a difference in gas pressure along the pathway, means for providing a signal representative of outlet temperature of the turbine as a function of the difference in gas pressure, and means for regulating operation of the engine system with the signal.

A further example includes: operating an internal combustion engine system including a turbocharger with a compressor and a turbine that defines a pathway for gas flow from the compressor to the turbine, determining a difference in gas pressure along the pathway, and providing a signal representative of a temperature associated with the turbine as a function of this difference. In one form, this example further includes regulating operation of the engine with the signal. Such regulation may include adjusting a variable geometry mechanism of the turbine to control temperature of the exhaust output therefrom.

Another example includes: operating an internal combustion engine system including a turbocharger and an emission control device that receives exhaust from the turbocharger, determining a signal representative of temperature of the exhaust from the turbocharger as a function of a gas pressure along a pathway between the compressor and the turbocharger, and regulating operation of the emission control device with the signal.

Still another embodiment includes: an internal combustion engine system with a turbocharger and an emission control device. The turbocharger includes a compressor and a turbine, and the engine system defines a pathway for gas flow between the compressor and the turbine. The system further comprises means for determining a signal representative of temperature of the exhaust as a function of the gas pressure along the pathway and means for regulating operation of the emission control device with the signal.

Yet another embodiment of the present invention is directed to a system, comprising: an internal combustion engine, a turbocharger including a compressor and a turbine each in fluid communication with the engine; a gas flow pathway defined between the compressor and the turbine; and a controller responsive to a pressure signal input to determine a control signal indicative of turbine outlet temperature therefrom, and selectively generate an output signal to regulate operation of the system. In one particular form, the system further includes a pressure sensor to detect pressure along the gas flow pathway and provide a corresponding signal to which the controller is responsive to determine the control signal. Alternative or additionally, the output signal from the controller is used to adjust temperature of the exhaust provided to an emission control device from the turbocharger in response to the control signal.

Any theory, mechanism of operation, proof, or finding stated herein is meant to further enhance understanding of the present invention and is not intended to make the present invention in any way dependent upon such theory, mechanism of operation, proof, or finding. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
    operating an internal combustion engine system including a turbocharger with a compressor and a turbine, the engine system defining a pathway for gas flow from the compressor to the turbine;
    determining a difference in gas pressure along the pathway;
    establishing a turbine outlet temperature signal as a function of the difference in gas pressure; and
    regulating operation of the engine system with the turbine outlet temperature signal.

2. The method of claim 1, wherein the engine system includes an intake manifold and an exhaust manifold that at least partially define the pathway, and the determining of the difference in gas pressure includes:
    sensing intake manifold pressure;
    sensing exhaust manifold pressure; and calculating the difference in gas pressure from the intake manifold pressure and the exhaust manifold pressure.

3. The method of claim 2, wherein the calculating is performed in accordance with a mathematical expression: ((EMP−IMP)/IMP) where, IMP variable represents an absolute intake manifold pressure and EMP variable represents an absolute exhaust manifold pressure.

4. The method of claim 2, wherein the providing the signal includes:
sensing a temperature along the pathway; and
determining the signal with the temperature and the difference in gas pressure.

5. The method of claim 4, wherein the determining of the signal is performed in accordance with a mathematical expression: ((TT−IMT)/IMT) where, IMT represents an absolute intake manifold temperature and TT represents the outlet temperature of the turbine.

6. The method of claim 1, wherein the engine system includes an emission control device to receive exhaust from the turbocharger and the regulating of the engine system includes changing temperature of the exhaust in response to the signal.

7. The method of claim 6, wherein the turbocharger includes variable geometry and the changing includes adjusting the variable geometry of the turbocharger to increase the temperature of the exhaust.

8. A method, comprising:
operating an internal combustion engine system including a turbocharger and an emission control device that receives exhaust from the turbocharger, the turbocharger including a compressor and a turbine, the engine system defining a pathway for gas flow between the compressor and the turbine;
calculating a turbine outlet temperature signal as a function of a gas pressure along the pathway; and regulating operation of the emission control device with the signal.

9. The method of claim 8, wherein the emission control device includes a particle trap.

10. The method of claim 9, wherein the regulating of the emission control device includes selectively increasing the temperature of the turbine outlet above a predefined threshold in response to the signal to perform a regeneration operation from time-to-time.

11. The method of claim 8, wherein engine system includes an intake manifold and an exhaust manifold each partially defining the pathway, and the function of gas pressure includes a gas pressure difference between the intake manifold and the exhaust manifold.

12. The method of claim 11, which includes further calculating the signal based on intake manifold temperature.

13. The method of claim 8, wherein the turbocharger includes variable geometry, and the regulating of the emission control device includes adjusting the variable geometry of the turbocharger to increase the temperature of the turbine outlet during a regeneration operation.

14. A system, comprising:
an internal combustion engine;
a turbocharger including a compressor and a turbine each in fluid communication with the engine;
a gas flow pathway defined from the compressor to the turbine;
a first pressure sensor to detect pressure along the gas flow pathway and provide a corresponding first sensed pressure signal;
an emission control device structured to receive exhaust from the turbocharger; and
a controller responsive to the first pressure sensor to determine a turbine outlet temperature control signal as a function of the first sensed pressure signal and selectively generate an output signal to adjust temperature of the exhaust provided to the emission control device from the turbocharger in response to the control signal.

15. The system of claim 14, further comprising a second pressure sensor to detect another pressure along the gas flow pathway and provide a corresponding second sensed pressure signal, the controller being operable to calculate the control signal in accordance with a difference between the first sensed pressure signal and the second sensed pressure signal.

16. The system of claim 15, wherein the engine includes an intake manifold and an exhaust manifold, the first sensed pressure signal corresponds to intake manifold pressure, the second sensed pressure signal corresponds to exhaust manifold pressure, and the controller is operable to further calculate the control signal in accordance with a ratio between the difference and the intake manifold pressure.

17. The system of claim 16, wherein the controller includes means for determining the control signal from temperature of the intake manifold.

18. The system of claim 14, wherein the emission control device includes a particle trap, and the emission control device is responsive to the controller to perform a regeneration operation from time-to-time.

19. The system of claim 18, wherein the turbocharger includes a variable geometry mechanism responsive to the output signal to change the turbine outlet temperature, and the controller is further operable to provide the output signal to increase the temperature of the exhaust provided to the emission control device to perform the regeneration operation.

20. The system of claim 14, wherein the turbocharger includes means for varying gas flow therethrough, the varying means being responsive to the output signal to adjust the temperature of the exhaust provided to the emission control device.

* * * * *